United States Patent Office 3,564,864
Patented Feb. 23, 1971

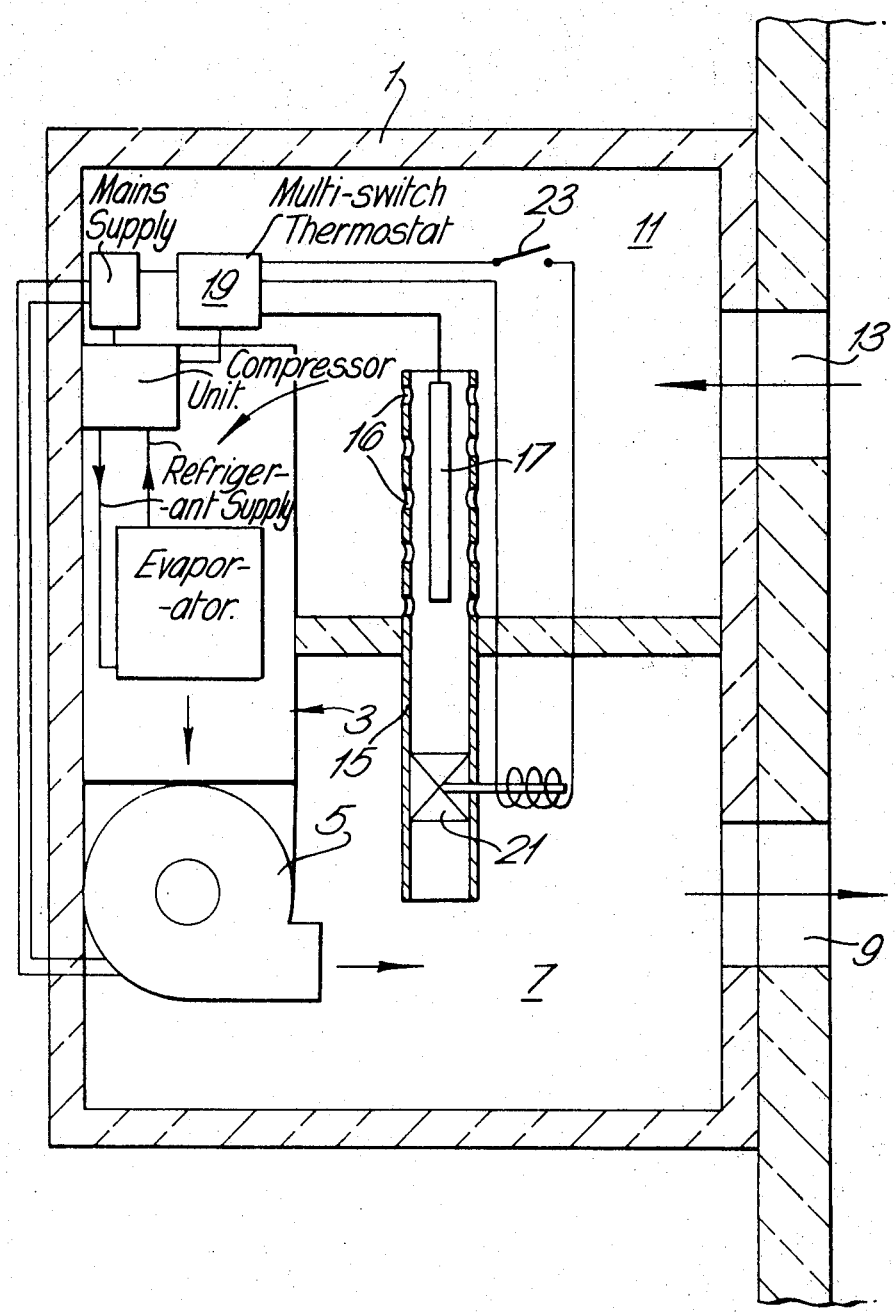

3,564,864
TEMPERATURE CONTROL APPARATUS
Gerald Robin Scrine, Girton, Cambridge, England, assignor to Shipowners Refrigerated Cargo Research Association, Cambridge, England, a corporation of United Kingdom
Filed Jan. 2, 1969, Ser. No. 788,423
Claims priority, application Great Britain, Jan. 4, 1968, 682/68
Int. Cl. F25d 17/00
U.S. Cl. 62—180        8 Claims

ABSTRACT OF THE DISCLOSURE

This invention relates to apparatus for controlling the temperature of a refrigerated cargo space, and in particular to apparatus for a clip-on refrigerator unit for a refrigerated container, in which the temperature of the supply of fluid to the cargo space or the temperature of the fluid returning from the space to the refrigerator unit is automatically monitored and hence, the refrigerator unit is controlled. The fluid, preferably air, is continuously circulated through the container and its temperature can be controlled either for chilled or frozen cargo.

This invention relates to an apparatus for controlling the temperature of refrigerated cargo spaces and particularly of refrigerated containers.

The current designs of refrigerated containers are provided with two apertures therein, one for the delivery of refrigerated air and the other for return air. These containers are normally fitted with a recording thermostat, the temperature sensitive part or bulb of which is placed in the return air from the container. Very often, however, especially when the containers are being used for carrying chilled cargo, as distinct from frozen cargo, it is required that the temperature of the air being delivered to the container be measured, so that it can be prevented from falling below a critical value. At the same time, it is also desired to record the temperature of the air returning from the container.

According to the present invention, apparatus for controlling the temperature of a refrigerated cargo space includes a tube, one part of which is perforated and houses the temperature sensitive part or bulb of a thermostat and another part having a valve therein for controlling the passage of gas through the tube, the tube being adapted to provide communication between air supply means to and air return means from a refrigerated cargo space.

Preferably, that part of the tube which is perforated is adapted to project into an air return duct, and the valve is situated between that part and an air supply duct.

Also according to the present invention, an apparatus for controlling the temperature of refrigerated cargo containers comprises a refrigeration plant having a cooler, a first duct for supplying cold air to the container, a second duct for air returning from the container and a fan for forcing air through the cooler and the first duct, a tube connected between the first and second ducts, part of the tube lying within the second duct and being perforated and having a temperature sensitive element of a thermostat arranged therein, a valve arranged in the tube between the temperature sensitive element and the end of the tube in the first duct, said valve controlling flow of air through the tube between the first and second ducts and being arranged to close when the temperature of the air passing the temperature sensitive element reaches a predetermined low value and being arranged to open when the temperature of the air reaches a predetermined high value.

Preferably, a differential adjusting device is fitted to the thermostat which may be of the recording type, such that the magnitude of the required temperature difference between low and high values can be set. When the container is to be used for frozen cargo, means is provided to ensure that the temperature sensitive device always measures the temperature of the air returning from the container. This means may be a switch which ensures that the valve remains permanently closed. When the container is used for other cargoes the valve is opened and closed at temperatures corresponding to the setting of the differential adjusting device, and the cooler is arranged to be started up whenever the valve is opened.

The invention is particularly designed for use with clip-on refrigeration units for containers, and is now described with reference to the accompanying drawing which shows schematically, in section, a refrigeration unit mounted on a container.

The single drawing figure is a sectional view of apparatus according to the invention, certain components and an electrical control circuit being shown schematically.

Referring to the drawing, a clip-on unit 1 is provided with a cooler 3, a fan 5 for circulating air, an air supply duct 7 leading from the cooler 3 and fan 5, and arranged to communicate with a supply aperture 9 in a container 10 and an air return duct 11 leading into the cooler 3 and arranged to communicate with a return aperture 13 in the container. A tube 15 is provided between the two ducts, the end of the tube situated within the return duct 11 being perforated at 16 and having a temperature sensitive element 17 forming part of a thermostat 19 therein, which may be of the recording type. It will be appreciated, however, that a multi-switch thermostat with a separate recorder fitted could be used. A solenoid operated valve 21 is also provided in the tube 15 between the temperature sensitive element 17 and the end of the tube opening to the supply duct 7. The perforations 16 in the tube allow return air to flow around and past the temperature sensitive element 17 when the solenoid operated valve 21 is closed.

Once the clip-on unit has been secured to the container 10, the fan 5 is set in motion and this remains in motion until the unit 1 is removed. The cooler is also started up. Since the air in the supply duct 7 will be at a greater pressure than that in the return duct 11, and, it is assumed, will be at a temperature above a predetermined low value, there will be a flow of air through the tube 15 from the supply to the return duct and past the temperature sensitive element 17. This element 17 is provided with a differential temperature adjusting device (not shown), and when the temperature of the supply air reaches a predetermined low value for the chilled cargo in the container, e.g. about 28–29° F. for grapes and about 54° F. for bananas, a signal is sent out by the temperature sensitive element 17 to the solenoid which causes the solenoid operated valve 21 to be closed and the cooler 3 to be shut down. The fan 5 will continue to blow air through the container 10 and this air, on passing through the return duct 11, will pass through the perforations 16 and the thermostat 19 will continuously monitor its temperature. When the temperature of this return air reaches a predetermined high value (for example about 3° F.– 8° F. above the low value), a further signal will be sent to the solenoid which will cause the solenoid valve 21 once again to be opened and the cooler 3 to be started up again. It will thus be appreciated that a fully automatic temperature control apparatus is provided which always gives a temperature reading. It will be understood that it will only be necessary to fix one temperature on the thermostat 19 and the differential adjusting device can then be set accordingly to give the other temperature.

When the apparatus is to be used for frozen cargo, means must be provided to ensure that the temperature sensitive device always measures the temperature of the air returning from the container, rather than the temperature of the air passing into the container. Hence, means are provided to ensure that when the apparatus is operating for freezing the temperature sensitive device 17 will measure the temperature of the air flowing through the aperture 13 into the return duct 11 instead of measuring the temperature of the air in the supply duct 7. This requires preventing air from flowing from the supply duct 7 through the tube 15. A simple way of ensuring that this does not occur is to provide an extra switch 23 to isolate the valve 21 from the cooler 3 so that at all times the valve remains closed. This switch 23 is shown as a manually operated switch in the drawing, but it will be appreciated that it could be automatically actuated, for example when the two predetermined temperature values on the thermostat are set to temperatures suitable for frozen cargo. Instead of providing an electrical switch, a mechanical switch could be provided and this could take the form of a barrier in the tube 15 between the solenoid operated valve 21 and the temperature sensitive device 17.

It will be appreciated that when the apparatus is operated for freezing, the multi-switch thermostat previously referred to will start the cooler 3 when return duct air at a predetermined high temperature passes through the perforations 16 into the upper end (as shown in the drawing) of the tube 15, and will stop the cooler when the air entering the tube 15 through the perforations 16 is at a predetermined lower temperature. The fan 5 runs continuously, not being controlled by the thermostat.

Although the above description has described a clip-on refrigeration unit. it will be apreciated that the invention could equally well apply to fixed forms of transport refrigeration, or for that matter to cold stores generally, whether on land, on a vehicle, or at sea, etc.

What is claimed is:

1. Apparatus for controlling the temperature of a refrigerated cargo space, including fluid supply means adapted to supply fluid continuously to said cargo space, fluid return means from said cargo space, a tube providing communication between said fluid supply means and return means, a part of said tube being located within said fluid return means and being formed with perforations, a thermostat for controlling the temperature of fluid flowing from said supply means to said cargo space, means locating the temperature sensitive part of said thermostat within said perforated part of said tube to enable said temperature sensitive part to be subjected to the thermal effect of fluid flowing from said fluid return means through said perforations and into said tube, and a valve situated in an unperforated part of said tube and spaced from said perforations, said valve controlling the passage of fluid through said tube.

2. Apparatus according to claim 1, in which the perforated part of said tube projects into said return means and the valve is situated between that tube part and said supply means.

3. Apparatus for controlling the temperature of a refrigerated cargo container, comprising a refrigeration plant including a cooler, a first duct for supplying cold air to the container, a second duct for air returning from the container, a fan for forcing air through said cooler and said first duct, a tube, means mounting said tube to provide communication through said tube between said two ducts with part of said tube lying within said second duct and being formed with perforations, an end part of said tube spaced from said perforations communicating with said first duct, a thermostat for controlling the temperature of fluid flowing from said first duct to said container, means locating the temperature sensitive element of said thermostat within said perforated part of said tube to enable said temperature sensitive element to be subject to the thermal effect of fluid flowing in said tube, a valve situated in said tube between said temperature sensitive element and said end part of the tube, said valve controlling the passage of air through said tube between said two ducts, means to close said valve when the temperature of the air flowing from said first duct through said tube and passing the temperature sensitive element reaches a pre-determined low value, and means to open said avlve when the temperature of the air flowing from said second duct through said perforations into said tube and passing said temperature sensitive element reaches a predetermined high value.

4. Apparatus according to claim 3, including a differential adjusting device fitted to said thermostat such that the magnitude of the required temperature difference between high and low values can be set.

5. Apparatus according to claim 4, including means for starting up said cooler when said valve is opened, when said container is to be used for cargo other than frozen cargo.

6. Apparatus according to claim 4, in which, when the container is to be used for frozen cargo, means is provided to ensure that the temperature sensitive device always measures the temperature of the air returning from the container.

7. Apparatus according to claim 6, in which said means comprises a switch provided to isolate the valve from the cooler so that the valve is kept permanently shut.

8. Apparatus according to claim 3 including means controlled by said thermostat for stopping operation of said cooler when said valve is closed in response to predetermined low temperature air passing said temperature sensitive element and for starting operation of said cooler when said valve is opened in response to predetermined high temperature air passing said temperature responsive element.

References Cited

UNITED STATES PATENTS

| | | | |
|---|---|---|---|
| 2,812,642 | 11/1957 | Jacobs | 62—186 |
| 2,939,296 | 6/1960 | Coblentz | 62—180 |
| 3,203,195 | 8/1965 | Armentrout | 62—180 |

MEYER PERLIN, Primary Examiner

U.S. Cl. X.R.

62—186, 215, 226